Dec. 15, 1964  W. W. PULTZ  3,161,473
METHOD OF MAKING BETA-SILICON CARBIDE FIBERS
Filed June 6, 1962
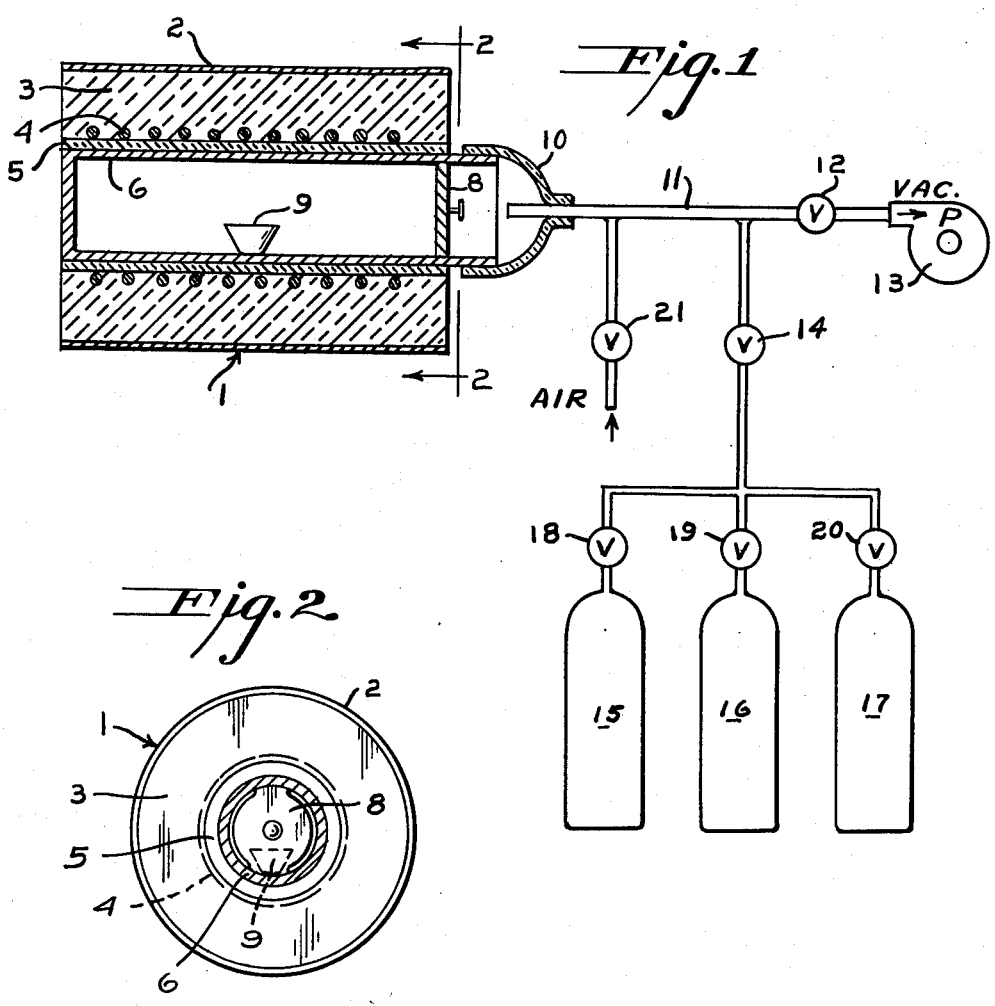
INVENTOR.
WALLACE W. PULTZ
BY
Clarence R. Patty, Jr.
ATTORNEY

United States Patent Office 3,161,473
Patented Dec. 15, 1964

3,161,473
METHOD OF MAKING BETA-SILICON
CARBIDE FIBERS
Wallace W. Pultz, Corning, N.Y., assignor to Corning
Glass Works, Corning, N.Y., a corporation of New
York
Filed June 6, 1962, Ser. No. 200,578
4 Claims. (Cl. 23—208)

This invention relates to the manufacture of ceramic fibers particularly suitable as reinforcing elements for plastics and, perhaps, metals. More specifically, this invention relates to the manufacture of fibers of silicon carbide (SiC) crystals.

Five methods have been proposed for growing silicon carbide crystals. The first method proposed has been the crystallization from liquid silicon carbide. This method would require extremely high pressures as has been the practice in synthesizing diamonds, since silicon carbide has no liquid phase under ordinary conditions. The high pressures and temperatures involved have severely limited the application of this procedure. The second method proposed has been the crystallization from a solution. Silicon at a temperature of about 1700° C. has been employed as a solvent, as carbon exhibits an appreciable solubility therein. An alternative solvent has been tin, although the solubilities of carbon and silicon are both small at any practicable temperature. The use of silicon as the solvent produces crystals containing excess silicon. However, the chief drawback to this method is the difficult crucible problem that is encountered. No real success has been attained in holding silicon in a crucible at its melting point (1420° C.) and higher without contamination such that crystals of good purity could be obtained. The third method proposed has been by thermal decomposition. When volatile compounds of silicon or carbon are heated to a sufficiently high temperature, thermal decomposition to silicon and carbon takes place. This led to the simultaneous decomposition of compounds of silicon and carbon yielding a deposit of SiC. The yields in such thermodecompositions have been substantially negative, some workers claiming the complete absence of SiC formation. The fourth method proposed has been by thermal reduction. This is similar to Method No. 3 except that the simultaneous decomposition of the silicon and carbon compounds is carried out in the presence of hydrogen. Crystals and whiskers have been successfully grown in this manner from reaction mixtures of silicon tetrachloride

$(SiCl_4)$+toluene $(C_7H_8)$+hydrogen $(H_2)$ or methyl trichlorosilane $(CH_3SiCl_3)$+hydrogen $(H_2)$. However, the yields were very small, the process expensive, and the fibers contained such a substantial amount of $SiO_2$ that a careful washing in concentrated hydrofluoric acid was necessary to remove it to permit a study of the fibers. The fifth method proposed has been by sublimation. This method has its foundation in the conventional production of SiC on a large scale by reaction of sand and coke in an electric furnace. The goal in this process is to produce a mass of very fine crystals for the manufacture of abrasive powder, but sometimes a pocket occurs in the charge of sand and coke and quite large crystals are formed. At high temperatures, the silica and carbon react to form polycrystalline SiC which is, in turn, sublimed during crystal growth. Considerable experimentation has been done by many workers in studying this process as the starting materials for this process and relatively inexpensive and, therefore, the possibility of developing a commercial process for producing silicon carbide crystals appears greatest from this method.

Much of the prior work has contemplated temperatures higher than 2000° C., usually 2200°–2700° C., in a furnace which is first pumped to a high vacuum and, thereafter, an atmosphere of argon, helium, or hydrogen is introduced. Such experiments have produced crystals of both the low temperature, cubic beta-SiC and the high temperature, hexagonal alpha-SiC. In some instances, where hydrogen formed the ambient atmosphere, whiskers of hexagonal alpha-SiC were produced. However, the quantity of such whiskers was small, the temperatures required for their formation were 2000° C. and higher, and their size was far from uniform, ranging from mainly submicroscopic fibers to a few having lengths of as much as 2 cm. with a diameter of as great as 5 microns. These factors have tended to relegate fibers of SiC to the role of mere curiosity items. Yet, these fibers have indicated the extraordinary physical properties which could be utilized if a practical method could be developed for their manufacture.

Therefore, the principal object of my invention is to provide a method for producing fibers of silicon carbide crystals which would be relatively simple in operation, economical in practice, and which would use readily available and relatively inexpensive starting materials.

Another object of my invention is to provide a method for producing fibers of silicon carbide crystals which have a relatively uniform diameter with lengths up to three inches and longer.

Yet another object of my invention is to provide a method for producing fibers of silicon carbide crystals which would be eminently suitable as reinforcing elements in plastics, rubber, glasses, and metals.

A still further object of my invention is to provide a method for producing fibers of silicon carbide crystals where, under controlled conditions, substantially all of the starting raw materials are utilized to produce fibers, thus resulting in a highly efficient operation.

FIG. 1 is a diagrammatic arrangement of apparatus suitable for producing fibers containing silicon carbide crystals according to the present invention.

FIG. 2 is a vertical sectional view along lines 2—2 of FIG. 1.

I have discovered that the objects of this invention can be achieved by the reaction of carbon and silica in an atmosphere of dissociated ammonia or an atmosphere of nitrogen and hydrogen. Broadly speaking, I have discovered that where carefully measured amounts of carbon and silica are heated together within a specific temperature range in an atmosphere wherein controlled partial pressures of dissociated ammonia or nitrogen-hydrogen mixtures are introduced, fibers of silicon carbide crystals of up to three inches in length and longer with a uniform diameter of about 1–5 microns can be produced.

More specifiically, my invention comprises the mixing together of carbon and silica in a molar ratio of about 1:1 to 3.5:1, transferring the mixture to a furnace, evacuating the furnace as the temperature thereof is raised, maintaining the residual gas pressure at less than 300 microns, exposing the mixture to a temperature range of at least 1375° C., but not more than about 1550° C., for a time sufficient to attain the desired fiber formation, generally at least about 1 hour, but not more than about 50 hours, with a preferred range of about 3 to 12 hours, during which period an atmosphere of dissociated ammonia or an atmosphere of nitrogen and hydrogen is produced within the furnace by introducing ammonia at partial pressures ranging from about 100–400 mm. or by introducing mixtures of nitrogen and hydrogen wherein the partial pressure of the nitrogen should be between 50–150 mm. in combination with sufficient pressure of hydrogen to give a total initial pressure of at least 400 mm. and perhaps as high as 700 mm., thereafter the product is cooled to room temperature. Experimentation has shown that fibers will form in systems where the pressure ratio of $H_2:N_2$ is varied from 2:1 to 9:1 if the total pressure is greater than 400 mm. A molar ratio of carbon and silica of 5:1, or 10:1, or even higher can be utilized in developing the large fibers of my invention. Nevertheless, experimentation has shown 3.5:1 to be a practical limit in that mixtures containing greater quantities of carbon than this leave an unwanted large residue of unreacted carbon after the fiber growth is completed. Likewise, where the ratio of carbon to silica is less than 1:1, there is insufficient carbon present to produce an economical or practical yield of fibers. Ideally, the carbon-containing material and the silica-containing material are present in such proportions to react completely, leaving no unreacted material.

I have learned that a very satisfactory growth of fibers occurs where extremely pure starting materials are used. However, the maximum yields have been obtained utilizing crude, coarse raw materials such as sand, coke, and charcoal. The ability to use such starting materials, thereby greatly reducing costs, has made the growth of large SiC fibers a commercial reality. Likewise, although gases of the highest purity are to be preferred for the greatest yield of fibers, excellent fiber growths are developed with the less pure varieties.

In the following examples, a refractory tube wound with platinum wire in such manner that a temperature gradient was set up along the length of the tube formed the furnace or reaction chamber. A refractory container or "boat" containing a mixture of sand and charcoal was then placed within the refractory tube at a position where the temperature desired could be obtained. The furnace was then heated up, a vacuum of at least 300 microns, and preferably 100 microns or even less, being applied to evacuate the furnace tube of contaminating vapors until a temperature of about 1170° C. was attained in the area of the refractory boat containing the sand-charcoal mixture. Ammonia gas or mixtures of nitrogen and hydrogen were then introduced into the evacuated furnace tube to the desired pressures and the temperature raised rapidly until the refractory boat was at the desired temperature. The refractory boat was held at this temperature for a predetermined time after which the furnace was cooled below about 400° C., brought to atmospheric pressure through the introduction of air, and the boat removed therefrom for examination.

Fibers varying in color from light green through dark green were observed averaging about one inch in length, with individual fibers longer than three inches, and of roughly uniform diameter ranging from two to four microns, thus giving a maximum length to diameter ratio of about 40,000:1. X-ray diffraction patterns identified the fibers as cubic beta-SiC. When viewed at high magnification, the fibers appear to have an irregular surface and in some instances seem to have grown by a screw dislocation. It has been suggested in the literature that silicon carbide crystals grow by a screw dislocation mechanism (Verma, A. R., phil. Mag., 42, 1005 (1951)).

A slight weight loss was observed when bulk fibers were treated with 48% hydrofluoric acid (HF). This weight loss is deemed to indicate the presence of silica. No direct evidence was garnered indicating whether this silica is present in the form of a sheath around a SiC core. The large fibers appear opaque to the electron microscope making it difficult to identify such a sheath material and resolution with an optical microscope has been impossible. However, microscopic studies have manifested a small amount of extraneous deposit in the form of fibers and irregular growth in with the SiC fibers. This extraneous deposit is transparent, does not exhibit birefringence, has a refractive index slightly less than 1.5, and is completely soluble in HF. This material is believed to be indeed $SiO_2$ which is formed through the disproportionation of silicon monoxide (SiO) during some period of fiber growth.

The table below indicates the chemical behavior of the various materials under consideration to selected acid reagents. The $HF-HNO_3$ mixture is compounded by adding a few drops of concentrated $HNO_3$ to several drops of 48% HF. No critical concentration relationship between these acids has been apparent in order to obtain a suitable test mixture. The combination of these acids gives a powerful complexing and oxidizing agent.

ACID SOLUBILITIES

|  | HF | $HNO_3$ | $HF-HNO_3$ |
|---|---|---|---|
| $SiO_2$ | Soluble | Insoluble | Soluble. |
| Si | Insoluble | do | Do. |
| SiC | do | do | Insoluble. |

In testing, the fiber in question is viewed through an optical microscope as the acid reagent is added. Interpretation is based on the solubilities set forth in the table. This test demonstrates in part the resistance to attack by acids which SiC possesses. The relative inertness of SiC to many common reagents is well-recognized and this characteristic has permitted the use of such fibers in contact with acids and bases, such as filter elements, and in corrosive atmospheres at high temperatures.

A gradient furnace useful for the following examples is depicted in side elevation at 1, consisting essentially of an alumina or sillimanite refractory tube 5 wound with platinum wire 4 surrounded with insulation 3, which in turn is held in place by a steel casing 2. The windings of the wire are so spaced as to permit a temperature gradient to exist along the refractory tube. A closed inner or working liner 6, consisting of a mullite refractory tube, is used to protect the wire-wound tube from injury and corrosion during the operation of the furnace and thus, at the same time, prevent contact of the reaction products and starting materials with the wire, thereby avoiding a furnace failure. The working liner 6 extends beyond the front of the furnace and is there connected to a pipe 11 through a glass connection 10. Pipe 11 leads to a vacuum pump 13 through valve 12, or to a source of air (not shown), through valve 21, or the desired gaseous atmosphere may be introduced into pipe 11, through valve 14, from lecture bottles 15, 16, and 17, containing ammonia, nitrogen, and hydrogen, respectively, through valves 18, 19, and 20. A fairly close-fitting platinum disc 8 acts as a radiation shield to limit the escape of heat from the furnace but yet allows a vacuum to be drawn and a gaseous atmosphere to be introduced into the furnace. An alumina refractory boat 9 is placed within the working liner 6 at the position where the desired temperature has been predetermined. Boat 9 contains a mixture of sand and charcoal.

In actual operation of the apparatus, boat 9 is filled with the charge of materials and placed into the working lining 6 at the proper positions. The radiation shield 8 is inserted into position. Pipe 11 is connected to the working lining 6 through the glass connection 10. The furnace is then heated up until a temperature of about 1170° C. is reached in the area of refractory boat 9, simultaneously evacuating the furnace chamber to a vacuum of about 100 microns, through vacuum pump 13. Valve 12 is then closed, valve 14 opened, and the desired gas from the proper lecture bottle passes over the refractory boat at a predetermined pressure. The working liner in the area of the boat containing the batch charge is then raised to the desired temperature and maintained thereat for suitable periods of time. Thereafter the furnace is cooled to about 400° C., brought to atmospheric pressure through the introduction of air through valve 21, and the boat removed from the furnace and the fibers examined.

The variations in added atmosphere gas and its affect on fiber yield is recorded in Table I. An approximate molar ratio of 1.8:1 charcoal to purified coarse sea sand was used in each batch charge. Each batch was reacted at 1450° C. for 12 hours in the atmospheres designated. The recorded pressures are initial pressures since carbon monoxide is produced during a given run through the carbon-silica reaction. Each description is an attempt to rank the yield of large fibers of beta-SiC by visual observation within the series indicated.

*Table I*

| Example No. | Initial Pressure (mm.) | | | Description |
|---|---|---|---|---|
| | $N_2$ | $NH_3$ | $H_2$ | |
| 1 | 25 | | 450 | Traces. |
| 2 | 50 | | 450 | Good yield. |
| 3 | 50 | | 150 | Traces. |
| 4 | 50 | | 250 | None. |
| 5 | 150 | | 300 | Fair yield. |
| 6 | 150 | | 450 | Good yield. |
| 7 | 160 | | | None. |
| 8 | 500 | | | Do. |
| 9 | 300 | | 300 | None. |
| 10 | | | 200 | Submicroscopic fibers only. |
| 11 | | 50 | | None. |
| 12 | | 100 | | Fair yield. |
| 13 | | 200 | | Do. |
| 14 | | 300 | | Good yield. |
| 15 | | 400 | | Fair yield. |
| 16 | Vacuum (50 microns) | | | None. |

Several pertinent observations can be made from this table concerning the effect of atmosphere on fiber growth where the reaction temperature is 1450° C. Example 16 demonstrates that an ambient atmosphere is required for fiber growth. Examples 7 and 8 teach that nitrogen alone will not promote growth of fibers, while Example 10 establishes that hydrogen alone leads to the formation of fibers, but of submicroscopic size only. The most important observation to be made, however, is the fact that an atmosphere of gaseous ammonia or a mixture of nitrogen and hydrogen is required to promote the growth of large fibers of beta-silicon carbide crystals. The partial pressures of these gases are extremely critical with 300 mm. $NH_3$ or 150 mm. $N_2$ in combination with 450 mm. $H_2$ being the preferred atmospheres.

The mechanism through which these atmospheres operate to promote fiber growth is not clearly understood, but it is concluded from the above table that the fiber formation is not dependent upon fragmented ammonia gaseous species, e.g., activated nitrogen atoms. It is deemed possible, however, for nitrogen to adsorb on a growing fiber and dissociate into nitrogen atoms, thereby giving the same end result for ammonia and nitrogen gases. The green color of the fibers suggests that indeed nitrogen is incorporated in the structure of the growing crystal. Pure beta-SiC is colorless, but investigators have found that the presence of nitrogen gives rise to green crystals (Lely, J. A., Ber. Deutsch. Keram. Gesell, 32, 229 (1955)). This finding would explain the green color of the fibers but laboratory analyses have thus far failed to unequivocally determine in which chemical state the nitrogen exists, i.e., whether it is occluded as a gas or bonded to the silicon or carbon.

The fibrous growth is likewise not deemed to be the result of thermal conductivity alone. An experiment using the batch materials as in Table I, but using an atmosphere of 150 mm. argon and 450 mm. $H_2$ was carried out for 12 hours at 1450° C. No large fibers were developed although argon and nitrogen are of the same order of magnitude in thermal conductivity. The thermal conductivity for the gas mixtures would be strongly dominated by the $H_2$. Yet, when helium, which has a thermal conductivity of the same order of magnitude as $H_2$, is substituted for hydrogen in the presence of $N_2$, the large fibers again failed to form.

The effect of heat conductivity on crystal growth type and rate of growth is well-documented in the literature (Keepin, George, R., J. App. Phys., 21 260 (1950)). Essentially, the thermal conductivity of the ambient atmosphere functions to remove the heat of condensation during crystal growth from the vapor phase. This factor can be especially critical where large heats are involved and this heat cannot be effectively conducted away from the growing area by the crystal body, i.e., the crystal is an insulator. Silicon carbide has a low heat conductivity and is classed as an insulator.

There is little doubt that ambient or environmental gases promote fibrous type growths in this type of reaction. That some atmosphere is mandatory for fiber formation is also apparent, since continuous evacuation of the reaction chamber always leads to non-fibrous deposits (Example 16). Thus, it is concluded that thermal conductivity is a factor in the fiber growth observed, but is not the only factor responsible for the different types of growth reported, i.e., large green fibers of SiC crystals or submicroscopic fibers of the same material.

Table II reports the effect of variations in time, temperature, and pressure of ammonia gas on the yield of large green fibers of beta-silicon carbide. Colloidal carbon and silica of the highest purity formed the starting materials in a molar ratio of 3.165:1.

*Table II*

| Example No. | Reaction Temperature, °C. | Initial Pressure, mm. | Time, hrs. | Description |
|---|---|---|---|---|
| 17 | 1,400 | 75 | 7 | None. |
| 18 | 1,400 | 300 | 7 | Fair yield. |
| 19 | 1,400 | 300 | 12 | Do. |
| 20 | 1,400 | 400 | 12 | Do. |
| 21 | 1,400 | 300 | 16 | Do. |
| 22 | 1,400 | 300 | 24 | Do. |
| 23 | 1,470 | 75 | 5 | None. |
| 24 | 1,470 | 300 | 3 | Good yield. |
| 25 | 1,470 | 300 | 7 | Do. |

This table illustrates that fiber growth is more rapid at higher temperatures. At temperatures below about 1375° C., the yield of large fibers becomes so small even after a reaction time of great length as to be economically impractical. At temperatures above about 1550° C., the production of a uniform fiber becomes difficult. Frequently, small balls of shiny, metallic-looking material appears on fiber endings. Some of these balls are soluble in the HF—$HNO_3$ acid mixture indicating silicon, while other balls are apparently insoluble therein indicating the conversion to SiC by the CO present in the atmosphere. After termination to the ball, further growth can occur. Endings are found with irregular growths and clusters of very fine fibers growing from the original fiber tip. In most instances where further growth occurs, a large fiber starts by a thickening growth downward toward the base of the original host fiber. This thickening of the smaller fiber to nearly 20 microns has been observed in various stages from the ball alone to an almost completed overgrowth. Likewise, while experimentation has demonstrated that the time for the growth of fibers should be at least about one hour, where very extended times of reaction are employed, i.e., more than about 50 hours, this irregularity and thickening in fiber growth can also occur even at the preferred temperatures.

It will be understood that modification in the design of the reaction apparatus and in the sequence of operations may be made without departing from the scope of the invention so long as the required interrelation of temperature, time, and atmosphere is observed. For example, in carrying out the process, the tube of the furnace may be heated to the proper temperature, evacuated to eliminate any contaminating vapors, the refactory boat containing the charge of carbon and silica then inserted, the gaseous atmosphere introduced, and the temperature held thereat until the desired fiber formation is attained.

The high strength and high modulus of elasticity of these fibers make them particularly suitable as reinforcing agents for plastics, rubber, and glasses. Experimentation has shown the possibility of their use as reinforcement for metals. The fibers also possess chemical inertness and with the physical dimensions which are obtainable, should find applications as a weavable, stable, high temperature material. Such uses could include re-entry parachutes for space vehicles and high temperature insulation blankets as the more glamorous applications. These fibers also have unique electrical properties which may find utility in subminiature electronic devices.

What is claimed is:

1. A method of making large fibers of beta-silicon carbide comprising the steps of providing a mixture of carbon and silica in a molar ratio of about 1:1 to 3.5:1 in a reaction chamber, simultaneously heating said reaction chamber to a temperature of at least about 1375° C. but not more than about 1550° C. and evacuating said reaction chamber to at least about 300 microns, introducing an atmosphere of nitrogen and hydrogen, wherein the initial pressure of nitrogen is about 50–150 mm. and the combined initial pressure of nitrogen and hydrogen is about 400–700 mm., maintaining said temperature for a time sufficient to attain the desired fiber formation, after which said fibers are cooled to room temperature.

2. A method of making large fibers of beta-silicon carbide in accordance with claim 1 wherein the time sufficient to attain the desired fiber formation is at least 1 hour, but not more than about 50 hours.

3. A method of making large fibers of beta-silicon carbide comprising the steps of providing a mixture of carbon and silica in a molar ratio of about 1.8:1 in a reaction chamber, heating said mixture to 1450° C., said reaction chamber being evacuated to about 100 microns until the temperature of said mixture reaches 1170° C., thereafter contacting said mixture with an atmosphere of nitrogen and hydrogen as the temperature is raised to 1450° C., wherein the initial pressures of nitrogen and hydrogen are 150 mm. and 450 mm., respectively, maintaining said contact for 12 hours, cooling said reaction chamber to 400° C., removing said fibers from the reaction chamber and cooling to room temperature.

4. A method of making large fibers of beta-silicon carbide in accordance with claim 3 wherein ammonia at an initial pressure of 300 mm. constitutes the atmosphere of nitrogen and hydrogen.

References Cited in the file of this patent

UNITED STATES PATENTS 2,854,364     Lely _____ Sept. 30, 1958

FOREIGN PATENTS 545,408     Canada _____ Aug. 27, 1957